United States Patent [19]

Lima et al.

[11] Patent Number: 5,767,767
[45] Date of Patent: Jun. 16, 1998

[54] METHOD AND APPARATUS FOR DETERMINING THE POSITION AND ALIGNMENT OF WHEELS

[75] Inventors: Tony M. Lima, San Jose; Guy M. Robby, Saratoga, both of Calif.

[73] Assignee: Aydius, Inc., Santa Clara, Calif.

[21] Appl. No.: 818,767

[22] Filed: Mar. 14, 1997

Related U.S. Application Data

[63] Continuation-in-part of Ser. No. 594,424, Oct. 27, 1995.

[51] Int. Cl.$^6$ .................................................. B60Q 1/00
[52] U.S. Cl. ......................... 340/438; 340/440; 33/203; 33/203.18
[58] Field of Search .................................. 340/438, 440, 340/454, 665, 666, 686; 250/491.1; 33/203, 203.18, 645

[56] References Cited

U.S. PATENT DOCUMENTS

| | | | |
|---|---|---|---|
| 2,672,597 | 3/1954 | Ritch | 340/52 |
| 3,438,646 | 4/1969 | Hannapel | 280/87 |
| 3,597,728 | 8/1971 | Kurtz | 340/52 |
| 3,956,830 | 5/1976 | MacMillan | 33/203.18 |
| 4,029,337 | 6/1977 | Bishop | 280/661 |
| 4,880,072 | 11/1989 | Sakamoto et al. | 180/140 |
| 4,933,852 | 6/1990 | Lemelson | 364/424.03 |
| 5,056,233 | 10/1991 | Hechel et al. | 33/203 |
| 5,143,400 | 9/1992 | Miller et al. | 280/661 |
| 5,531,030 | 7/1996 | Dale, Jr. | 33/203 |
| 5,553,389 | 9/1996 | Winslow et al. | 33/203.18 |

*Primary Examiner*—Thomas Mullen
*Assistant Examiner*—Anh La
*Attorney, Agent, or Firm*—Beyer & Weaver, LLP

[57] ABSTRACT

A system and method are disclosed for providing an on board sensor for determining the relative position of linkage members in an automobile linkage which connects a wheel to an automobile body. The sensor includes a trackable object which is configured to be physically coupled to a first linkage member. A tracking device that is suitable for association with a second linkage member is configured to be magnetically coupled to the trackable object so that the movements of the trackable object are tracked by the tracking device as a result of the magnetic coupling between the trackable object and the tracking device. A detector is configured to determine the position of the tracking device so that the determined position of the tracking device associated with the second linkage member determines the position of the first linkage member which is physically coupled to the trackable object.

24 Claims, 6 Drawing Sheets

1

METHOD AND APPARATUS FOR DETERMINING THE POSITION AND ALIGNMENT OF WHEELS

CROSS REFERENCE TO RELATED APPLICATIONS

This application is a continuation in part of application Ser. No. 08/549,424, filed Oct. 27, 1995 (Attorney Docket No. AYDSP001), which is incorporated herein by reference for all purposes.

BACKGROUND OF THE INVENTION

1. Field of the Invention

The present invention relates generally to a method and apparatus for measuring the alignment and positioning of wheels, including the toe and camber.

2. Description of the Related Art

A durable and reliable on-board sensor for determining the position and alignment of wheels in real time would be useful both to provide drivers with information about the alignment of their wheels between visits to the alignment shop and to provide data for an advanced automatic alignment system as well as active suspension systems. Proper wheel alignment is important for safety, for avoiding unnecessary premature tire wear and for fuel economy. In order to determine whether the wheels are properly aligned, it would be useful to provide a system including a sensor which could interpret alignment data and provide a positive determination of the state of the wheel alignment.

To be effective, such a sensor would need to survive in the extremely dirty and vibrating environment surrounding the wheel. Such a sensor would need to be small so that mounting options would exist in the small spaces available, particularly in front wheel drive cars. Specifically, it would be desirable if the sensor could be mounted on the lower control arm in order not to interfere with the CV joint and CV boot. Furthermore, the sensor would need to measure the relative position of the various members used to attach a wheel to a car which are connected with three degrees of freedom by a ball joint and are constantly moving relative to each other.

A sensor which provides a physical coupling between such members would be vulnerable to long term wear as well as to sudden destructive jerks. It would therefore be desirable if a sensor could be provided which did not physically couple the members. It would furthermore be desirable if such a sensor could be installed in a simple manner without modifying any of the existing members. It is also important that such a sensor be capable of surviving and functioning for a long period of time.

U.S. Pat. No. 3,438,646 issued to Hannapel describes a sensor for indicating alignment changes. However, it appears that the sensor described would require significant modification to the ball joint in order to function. Furthermore, no method of making a positive determination of wheel alignment is taught. Specifically, a pair of meters are disclosed which measure a current which is a function of the alignment of the wheels as well as speed at which the wheels are being turned. It is left to the user to compare the readings on the meters and no positive measurement of a degree of alignment or misalignment is taught.

U.S. Pat. No. 3,597,728 describes a means for detecting anomalies in a moving vehicle which requires a physical coupling between the steering arm and the tie rod of each front wheel. The device is fixed by the tie rod and slides along the steering arm in a manner which causes a switch to be activated by a notch in the steering arm. An indicator light is controlled by the switch and indicator lights connected to a left tie rod and a right tie rod may be compared to ascertain changes in alignment. Again, no positive determination of wheel alignment or misalignment is taught and no quantitative determination of the extent of misalignment is made. The vehicle operator must monitor the indicator lights while operating the vehicle and make judgments regarding alignment. This is a somewhat difficult judgment to make since as the vehicle encounters bumps and different grades on the road, short term alignment is continually affected. It would be more desirable if a sensor could be provided which could determine alignment status based on the data collected, distinguishing between temporary misalignments and persistent misalignments. Moreover, if such a sensor could make more detailed measurements and statistically analyze those measurements, then an accurate determination of the state of wheel alignment could be made.

U.S. Pat. No. 4,029,337 also describes a camber indicating linkage which includes a physical coupling between the wheel and the frame. U.S. Pat. No. 2,672,597 discloses another indicator of vehicle wheel position which requires a physical coupling between the wheel and the frame.

U.S. Pat. No. 5,143,400 describes an active toe adjustment apparatus which includes an active adjustment unit which is designed to be interposed between two ends of a tie rod. In order to install the device, a tie rod must be split into two parts and the position of one of the ends is adjusted. Such a device would require for operation an accurate sensor which would provide data from which necessary adjustments could be determined. No such sensor is disclosed. Furthermore, the system is designed to make short term adjustments to the tie rod lengths, and not to make long term adjustments to overall wheel alignment. What is needed is a system which would include an accurate sensor and which could reliably make accurate long term adjustments to the vehicle's alignment without altering the structural integrity of the tie rods or the steering arm.

Thus, what is needed is a compact wheel position and alignment sensor which does not physically couple a portion of the wheel linkage that moves with the wheel with a portion of the wheel linkage that moves with the frame. Furthermore, a positive determination of alignment based on data from the sensor would be useful. Such a sensor could provide accurate and reliable wheel alignment data as well as support automatic alignment adjustments.

SUMMARY OF THE INVENTION

Accordingly, a sensor which does not require a physical coupling between the wheel and the frame is disclosed. In one embodiment, a magnetic tracking device is coupled to a magnetically trackable object. The magnetic coupling enables the tracking device to accurately determine the alignment of the wheel. A range of positions are measured, facilitating the analysis of data to provide a reliable alignment measurement. A system and method for determining alignment are provided such that the state of alignment is positively determined based on the comparison of a pair of relative angular measurements with measurements known to correspond to an aligned condition.

In one embodiment, an on board sensor for determining the relative position of linkage members in an automobile linkage which connects a wheel to an automobile body is disclosed. The on board sensor includes a trackable object which is configured to be physically coupled to a first linkage member. A tracking device suitable for association with a second linkage member is configured to be magnetically coupled to the trackable object so that the movements of the trackable object are substantially tracked by the tracking device as a result of the magnetic coupling between the trackable object and the tracking device. A detector configured to determine the position of the tracking device and the determined position of the tracking device associated with the second linkage member determines the position of the first linkage member which is physically coupled to the trackable object.

In another embodiment, a method of determining the state of alignment of wheels having toe angles is disclosed. The method includes defining an alignment condition when a first wheel having a first toe angle and a second wheel having a second toe angle are substantially aligned with each other. A first aligned toe angle of the first wheel relative to a first reference point is determined, along with a second aligned toe angle of the second wheel. The aligned angular difference between the first aligned toe angle of the first wheel and the second aligned toe angle of the second wheel is used to define an alignment range of differences between the first toe angle of the first wheel and the second toe angle of the second wheel. The differences within the alignment range of differences substantially corresponds to the wheels being substantially aligned. The alignment state of the wheels is tested by determining a first test toe angle of a first wheel relative to a first reference point and determining a second test toe angle of a second wheel relative to a second reference point. The tested angular difference between the first test toe angle and the second test toe angle is used to determine whether the tested angular difference is within the alignment range so that it is determined whether the two wheels are aligned.

These and other features and advantages of the present invention will be presented in more detail in the following specification of the invention and the figures.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1A:
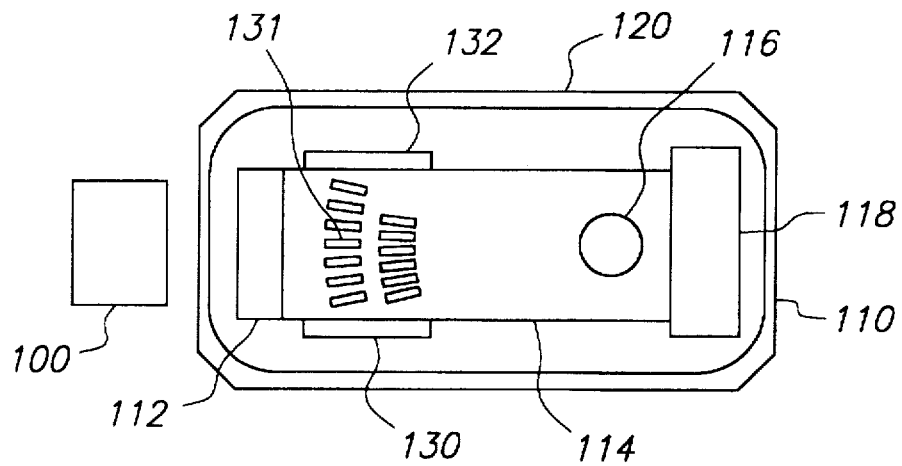
FIG. 1A is a block diagram which illustrates a sensor constructed according to one embodiment of the present invention that is designed to measure one degree of freedom of movement.

FIG. 1A is a block diagram which illustrates a sensor constructed according to one embodiment of the present invention that is designed to measure one degree of freedom of movement. A magnet 100 functions as a tracking object. A tracking device 110 is configured so that when it is located in the vicinity of magnet 100, it tracks the position of magnet 100. In the embodiment shown, a pointer 112 which is made of a ferrous material such as steel is included. Pointer 112 tends to follow magnet 100 as a result of the magnetic coupling force which exists between the two objects.

It should be noted that other configurations of magnetic or ferrous materials fall within the scope of the present invention. For example, in certain embodiments, pointer 112 is a magnet and the object which it tracks is either a ferrous material or another magnet. In other embodiments, both the tracking object and the pointer are magnets. When both the tracking object and the pointer are magnets, the polarity axis of the magnets is vertically oriented in certain embodiments and horizontally in others. In certain embodiments, the tracking object and the pointer are purposively offset from each other a distance in a direction perpendicular to the direction of measurement.

By varying the design of the magnetically coupled pointer/tracking object system, the response of the system is tuned. For example, in one embodiment, the system is tuned so that the pointer does not follow certain low amplitude high frequency jitters of the tracking object. The magnetic coupling force is adjusted according to the desired distance from pointer 112 and the desired tracking characteristics.

Pointer 112 is connected to a swing arm that rotates about a pivot 116. Swing arm 114 restricts the movement of pointer 112 to one degree of freedom of movement. Thus, if the unit is mounted horizontally, the toe angle of a wheel would be measured and if the unit is mounted vertically, then the camber of a wheel would be measured. A diagonally mounted unit would measure a combination of toe and camber. A counterweight 118 balances swing arm 114. Generally, the distance from pivot 116 to counterweight 118 and the weight of counterweight 118 are designed to balance the pointer and swing arm about pivot 116.

This structure is very durable. The only moving part included in the sensor is swing arm 114. Since pointer 112 is magnetically coupled to magnet 100, the entire swing arm assembly may be sealed in a rigid enclosure 120. If a high quality bearing such as are available from Precision Industrial Components Corporation in Middlebury Connecticut is used, then it is likely that the sensor will outlast the car to which it is attached.

An optical encoder 130 is shown associated with swing arm 114. Other types of encoders including analog type encoders such as resistive potentiometers or analog optical potentiometers or a Hall effect encoder are used in other embodiments. The analog output from such devices is digitized for input to the microcomputer. Optical encoder 130 encodes the position of swing arm 114 which rotates about pivot 116 relative to a reference point. It includes an upper optical grid 131 and a lower optical grid 132. In the embodiment shown, the reference point is lower optical grid 132 which is fixed to enclosure 120. Upper optical grid 131 moves angularly in relation to lower optical grid 132. Thus, the angular position of magnet 100 is determined relative to enclosure 120 and the structure upon which enclosure 120 is mounted.

Figure 1B:
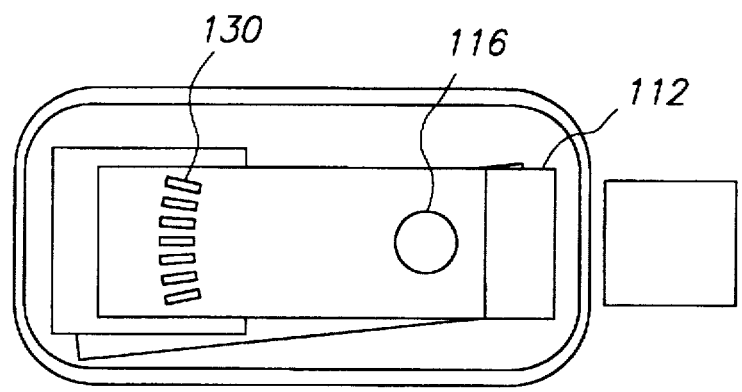
FIG. 1B is a block diagram which illustrates a sensor constructed according to another embodiment of the present invention.

The physical characteristics of the sensor are tuned to provide an optimal response to movement of magnet 100. For a swing arm range of plus or minus 4 degrees, a swing arm length of 2 inches is used in one embodiment. As shown in FIG. 1A, swing arm pivot 116 is located between optical encoder 130 and counterweight 118. FIG. 1B is a block diagram which illustrates a sensor constructed according to another embodiment of the present invention where pivot 116 is located between pointer 112 and optical encoder 130. In this arrangement, the ratio of the angular distance traversed by pointer 112 to the angular distance traversed by upper optical grid 131 in relation to lower optical grid 132 at the optical encoder is equal to the ratio of the distance of pointer 112 from pivot 116 to the distance of lower optical grid 132 from pivot 116. In such an arrangement, a given movement of pointer 112 will correspond to a larger movement of upper optical grid 131 through optical encoder 130, thereby registering a greater number of pulses by optical encoder 130. This increases the precision of the system while decreasing somewhat the angular range which may be measured. Generally, the position of pivot 116 varies in different embodiments according to the range and precision desired.

In certain embodiments, the swing arm motion is damped to remove jitter from the system and avoid the need to remove jitter electronically. Damping may also reduce encoding errors which are described below.

Figure 1C:
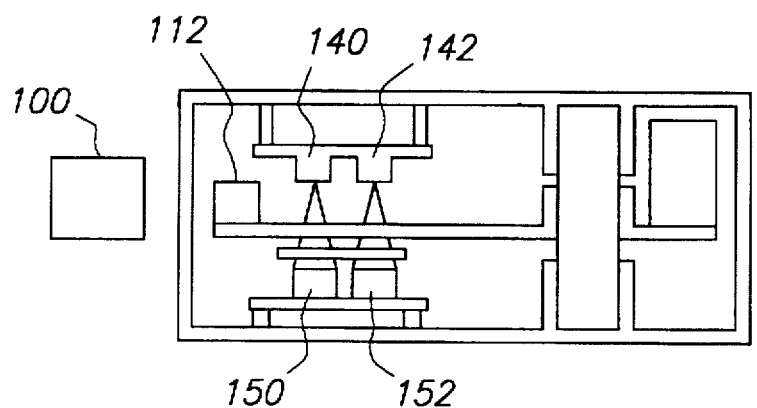
FIG. 1C illustrates a side view of a sensor from which the detailed operation of an optical encoder may be shown.

FIG. 1C illustrates a side view of the sensor from which the detailed operation of optical encoder 130 may be further shown. As magnet 100 is tracked by pointer 112, light from an LED 140 and an LED 142 is directed through upper optical grid 131 and lower optical grid 132 onto a detector 150 and a detector 152. As is known in the art of optical encoders, upper optical grid and lower optical grid are arranged in a configuration which creates a quadrature encoder which provides a series of pulses that correspond to movements of the swing arm in either direction, together with a signal that indicates whether the current movement is in the positive or negative direction. In one embodiment, a resolution of 80 pulses for movement corresponding to 8 degrees, or 10 pulses per degree is provided. Other resolutions ranging from 10 pulses per degree to 40 pulses per degree are also used, depending on the precision of the measurement that is desired. Thus, the encoded position of swing arm 114 is determined by counting the positive and negative pulses. In the embodiment shown, detector 150 provides a signal that includes the pulses and detector 152 provides a signal that indicates the direction of movement.

The optical encoder used in the embodiment shown uses standard optical grids such as those which are available from Hewlett Packard located in Santa Clara, Calif. Other embodiments use alternative optical grids. In certain embodiments, a photointeruptor, such as the photointeruptor available from Sharp Electronics in Osaka, Japan is used instead of the optical encoder described above. An analog encoder may also be used. In all of these embodiments, the position of the swing arm is converted to either a digital or analog electrical signal which may be processed.

In embodiments such as the one described above which use a digital encoder that counts pulses, it is possible, as a result of either very fast movement of swing arm 114 or noise, for pulses to be missed or extra pulses to be counted. In order for the sensor to measure the relative toe angle of the tire relative to a point fixed relative to the frame, it is necessary for the count to be corrected or else a count of 10, for example will correspond to different points at different times depending on the extra pulses or missed pulses which have occurred.

This problem is dealt with in some embodiments by resetting the count upon the occurrence of a single net full sweep of the swing arm. A counter reset processor monitors the positive and negative pulses and determines when enough net pulses have been registered in one direction to correspond to a full sweep of the sensor from one angular extreme to the other. The counter reset processor then resets the count to the lowest or highest value, depending on the direction of the full sweep. In one embodiment, the full range of the sensor is 8 degrees and so it is likely that full sensor sweep reset opportunities will occur often when the vehicle is being driven, since the wheels are likely to be turned by greater than 8 degrees fairly often.

Figure 2:
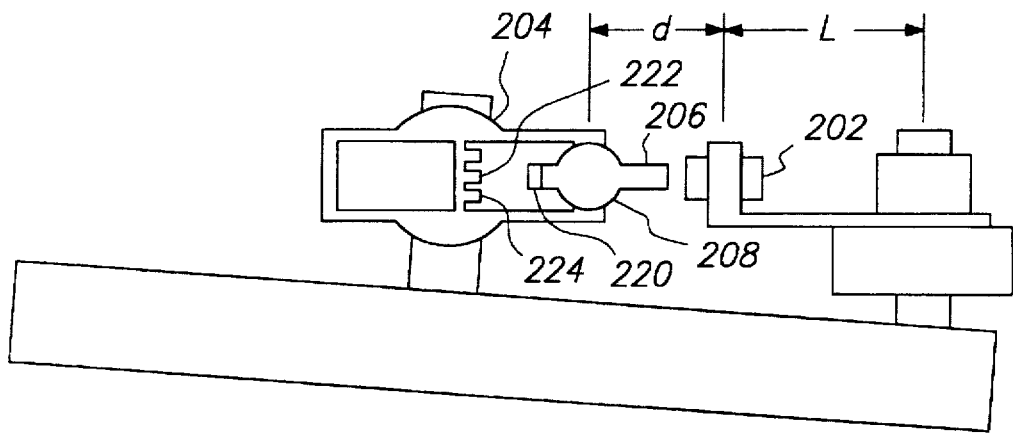
FIG. 2 is a block diagram which illustrates a sensor that is configured to measure two degrees of movement, for example toe and camber, simultaneously.

FIG. 2 is a block diagram which illustrates a sensor that is configured to measure two degrees of movement, for example toe and camber, simultaneously. A magnet 202 functions as a tracking object. Magnet 202 is mounted on the structure which is being tracked. A tracking device 204 includes a pointer 206 which is magnetically coupled to magnet 202. Pointer 206 is supported by a joint 208 which allows pointer 206 to move in at least two dimensions. A mirror 220 is also connected to joint 208 so that the movement of pointer 206 is followed by the mirror. A light source 222 is positioned so that radiation is directed toward mirror 220. A set of detectors 224 are arranged in a two dimensional array around light source 222 so that light from light source 222 which is reflected by mirror 220 is incident upon certain of the detectors, depending on the orientation of mirror 220. Thus, pointer 206 is magnetically coupled to magnet 202 and movement of pointer 206 changes the orientation of mirror 220 in a manner that causes light reflected by mirror 220 to be incident upon various ones of detectors 224. The signals from detectors 224 therefore determine the orientation of pointer 206, thereby tracking the movement of magnet 202.

As noted above with respect to the one degree of freedom sensor shown in FIG. 1, the tracking object may be a magnet or a ferrous material and the pointer may be a magnet or a ferrous material, so long as a magnetic coupling between the pointer and the tracking object enables the tracking device to track the movement of the tracking object.

Figure 3:
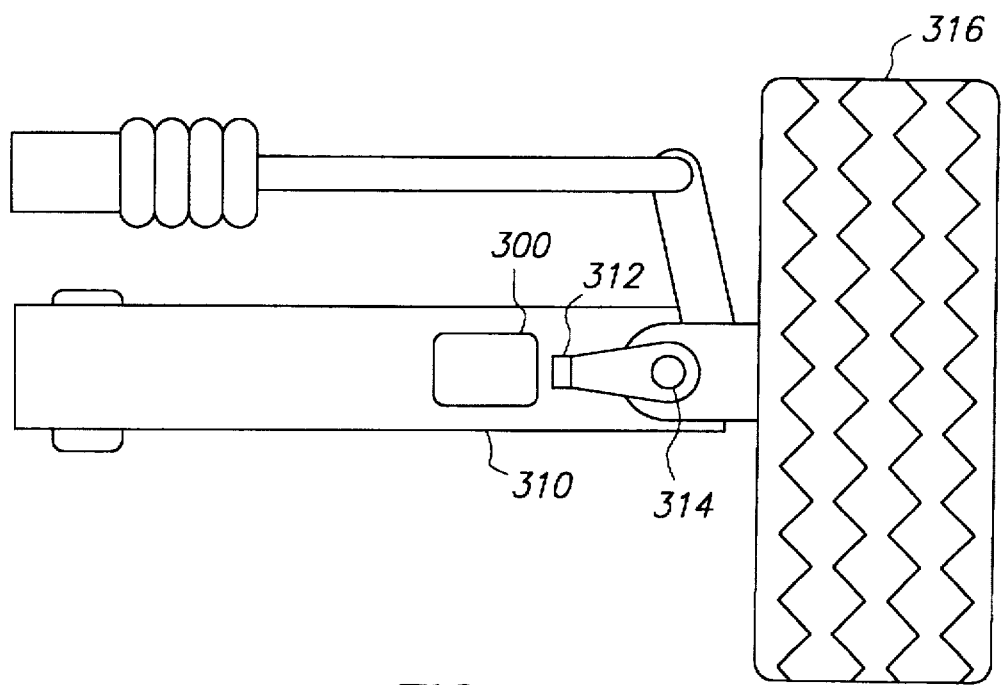
FIG. 3 is an illustration of one mounting scheme for a sensor, which is similar to the sensor depicted in FIG. 1.

FIG. 3 is an illustration of one mounting scheme for a sensor 300, which is similar to the sensor depicted in FIG. 1. Sensor 300 is mounted to a lower control arm 310 of a vehicle. A magnet 312 is mounted to a lower ball joint sleeve 314. Lower ball joint sleeve 314 moves in conjunction with a wheel 316, while lower control arm 310 is fixed in the horizontal dimension relative to the frame. Thus, as sensor 300 tracks the position of magnet 312, the toe angle of wheel 316 relative to the frame is determined. Other mounting options are included within the scope of the present invention. Indeed, it is a feature of sensor 300 that it may be mounted in numerous locations because of its compact size and self-contained design. For example, if sensor 300 were rotated 90 degrees, then it would measure camber instead of toe.

Figure 4:
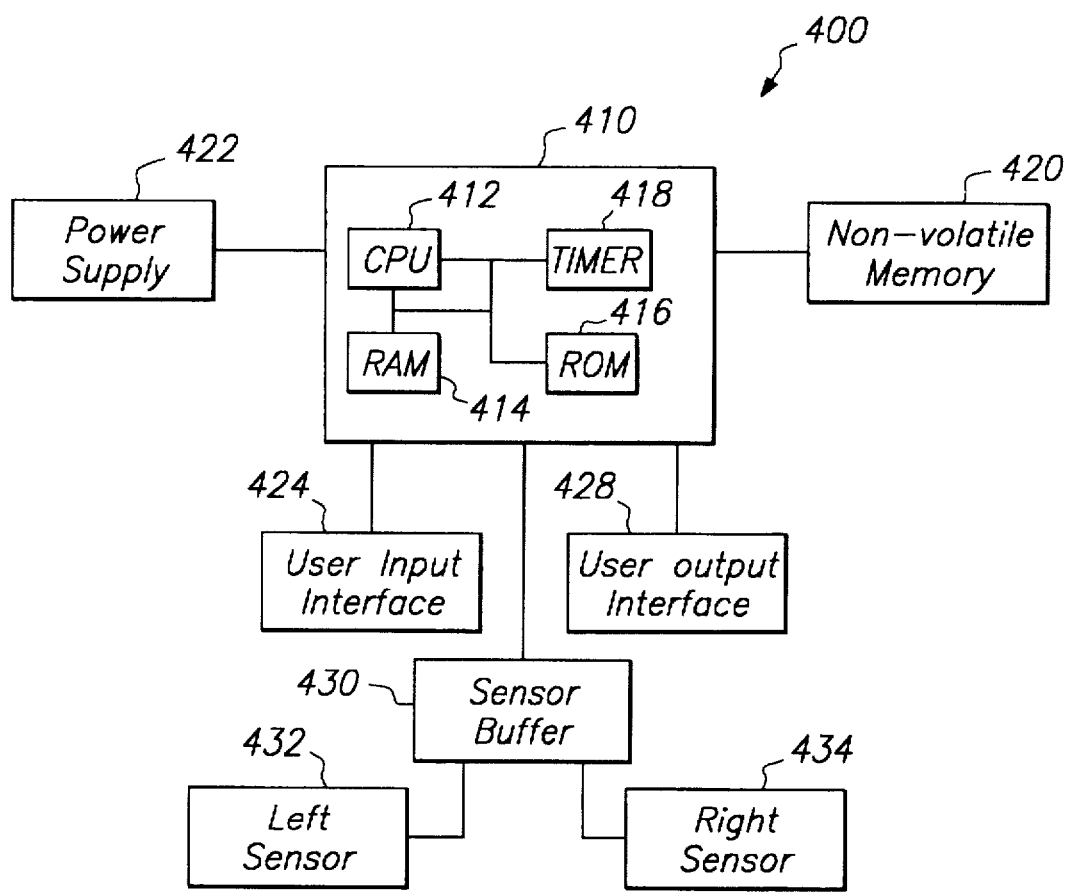
FIG. 4 is an illustration of a wheel alignment monitoring system which uses two sensors to monitor the alignment of two wheels.

FIG. 4 is an illustration of a wheel alignment monitoring system 400 which uses two of the above-described sensors to monitor the alignment of two wheels. An alignment processing unit 410 is a microcomputer which includes a CPU 412, a RAM 414, a ROM 416 and a timer 418. Alignment processing unit 410 is also connected to a non-volatile memory 420 and a power supply 422, a user input interface 424, a user output interface 428, and a signal conditioner 430. Signal conditioner 430 is connected to a left sensor 432 and a right sensor 434.

When the system is turned on, power is provided by power supply 422 to alignment processing unit 410. Alignment processing unit 410 then receives instructions from the user via user input interface 424. Example instructions are to calibrate the system or to measure alignment. If an instruction to calibrate is received, then alignment processing unit 410 retrieves data from a signal conditioner 430. Signal conditioner 430 in certain embodiments conditions the signal by sharpening the edge transitions or filtering out certain noise. In certain embodiments, signal conditioner may contain a buffer, although in most preferred embodiments, no buffer is needed and alignment processing unit 410 reads in data as it is digitized and uses RAM 414 for any required storage during processing.

The data in signal conditioner 430 includes samples taken over time of the counts indicated by the left and right sensors. It should be noted that in different embodiments, analog or digital sensor outputs are provided. When an analog output is provided, then an analog to digital converter would also be included in addition to or as part of signal conditioner 430. Alignment processing unit 410 determines from the difference in the counts for left sensor 432 and right sensor 434 what the measured relative angular difference between the two sensors is when the wheels are in an aligned state. It should be noted that calibration therefore does not require skilled adjustment of the sensor. Calibration is performed by sending a calibration command to alignment processing unit 410 when the wheels are in a known aligned state.

User input interface 424 may include a button or series of buttons or switches on the dash which are used to send messages to the system to power up or to start a test. If a single switch is used, then different sequences of signals are defined to correspond to different operations. For example, three presses may mean to start a test. In other embodiments, user input interface 424 is specially adapted to require no installation of a switch in a vehicle cabin. Instead of relying on signals produced by a dedicated switch, the unit receives instructions from a user by sensing the effect of certain events on the vehicle electrical system.

For example, when the vehicle is first started, a large amount of current is pulled from the battery. As a result, the voltage at the voltage regulator increases to recharge the battery. This voltage increase may be sensed and is used in one embodiment as a signal to power up the wheel alignment monitor. Activation of auxiliary functions such as the heater likewise pulls current from the battery and therefore momentarily affects the voltage which may be sensed at the connection to the vehicle's power source. In some embodiments this is sensed directly at a wire connected to the battery. In one embodiment, turning on the heater a specified number of times is used as a signal to the wheel alignment monitor to begin a test. Turning on the headlights or other appliance which draws current could also be used as a signal.

Figure 5:
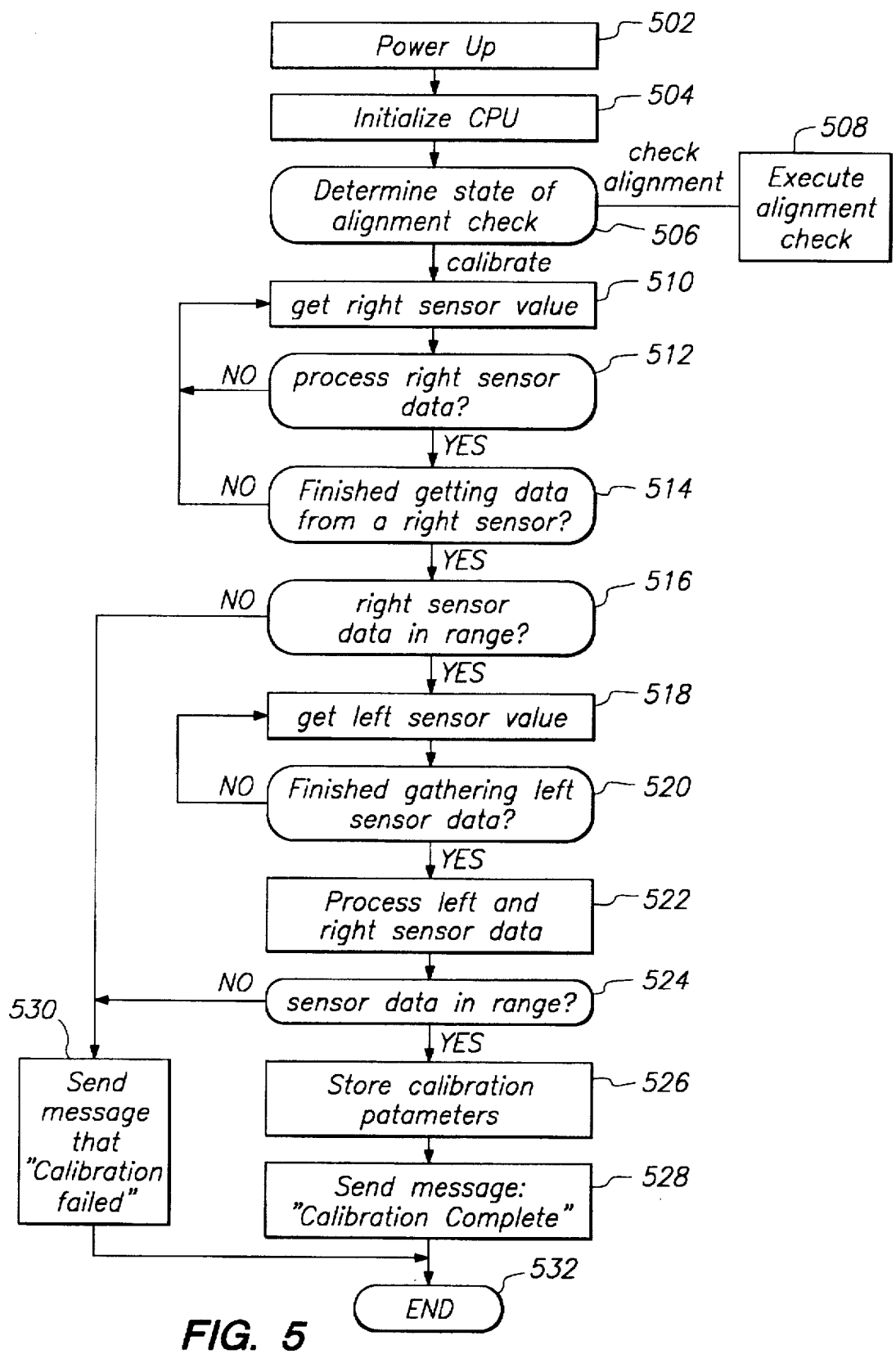
FIG. 5 is a process flow diagram which illustrates the process implemented on an alignment processing unit for calibration.

FIG. 5 is a process flow diagram which illustrates the process implemented on alignment processing unit 410 for calibration. The system powers up in a step 502. The CPU is initialized in a step 504. In a step 506, the system checks whether an alignment check or a calibration is to be performed. In one embodiment, a button is provided on the unit which the wheel alignment technician may press to indicate calibration. In this embodiment, the number of times that the switch is pressed may indicate other user defined information including the type of car or the state of the alignment. In other embodiments, the unit is provided with an interface to which an input unit may be connected for the purpose of providing information to the unit from the wheel alignment technician for the purpose of calibration.

If the unit is checking alignment, then control is transferred to a step 508 and an alignment check is performed. If a calibration is being performed, control is transferred to a step 510 and the unit gets data from the right sensor. In a step 512, the data is processed. When the unit is finished gathering data from the right sensor, then control is transferred from a step 514 to a step 516 which checks whether the data is in an acceptable range. If it is not, then control is transferred to a step 530 and a message that the sensor is misaligned is sent. This condition can occur, for example, in a case where the sensor was installed improperly so that when the wheels are straight, the sensor reads very close to one end of its range. This would prevent changes in wheel position being satisfactorily registered in one direction. In certain embodiments, the right sensor data is not processed immediately, but is instead stored and checked in relation to the left sensor data after left sensor data is read. Thus, in such embodiments, a pair of data points is read before a decision is made whether the calibration was successful.

If the right sensor data is acceptable, then control is transferred to a step 518 where the left sensor data is read. When the left sensor is finished being read, then control is transferred to a step 522 where the left and right sensor data is processed. During this data processing step, the difference between the reading on the two sensors is determined. This difference is the difference that corresponds to an aligned condition. In some cases, a single difference is determined for a single right value and a single left value. In other embodiments, a plurality of data points are determined which correspond to different positions of the wheels. The wheels are repositioned during calibration so that, for example, three data points are obtained, one for the wheels centered, one for the wheels turning right, and one for the wheels turning left. The wheels may be repositioned by the operator who may indicate via an interface when each desired position is reached, or the wheels may be continually moved and data points continually obtained until points which correspond to desired positions are obtained. The advantage of using multiple calibration points is that, when alignment is checked, it is possible to compare different points and obtain a more reliable measurement. The variance in the difference between the right and left sensor at the different points is also used in certain embodiments to determine whether the calibration points are acceptable. Thus, the reliability of calibration and alignment is enhanced in certain embodiments by either taking multiple points in the same position and averaging while noting the variance of the points as an indication of errors or by taking multiple points at different positions and noting the difference between the left and right values at the different points. The variance in the difference is again an indication of errors and the differences may be averaged to obtain a single value.

If the sensor data is within a desired range, then a step 524 transfers control to a step 526 where the calibration parameters are stored. If the sensor data is not within the desired range, then step 524 transfers control to step 530 and a message is sent indicating that the calibration failed. In one embodiment, the stored calibration parameters include the difference calculated between the sensors for each of the one or more positions selected for sensor readings. In certain embodiments, allowance is made for the fact that the wheels may not be exactly aligned during calibration. For example, let position 0 correspond to a straight aligned wheel. There may be an acceptable alignment tolerance of plus or minus 10 units. The wheels may be aligned, then at position +3.

It is possible to store not only the aligned position measured by the sensor, but also a known amount by which that position is off from a perfectly aligned position. (This information would be read from the alignment shop's equipment.) This information is then used to change the alignment range defined for the alignment check so that misalignment is detected for values ranging from encoder values that correspond to −10 to +10 centered about 0 and not to encoder values that correspond to −7 to +13 and are centered about the calibration position +3. The alignment range within which the wheels are considered to be satisfactorily aligned is referred to as the "dead band." The dead band can vary depending on the model of the car. This correction is made in embodiments where it is desired to make allowance for cases where the calibration is performed when the alignment is off a certain known amount. It should also be noted that it is possible to either use a standard or default predetermined alignment range or dead band, or to use an alignment range which is custom selected based on the car or the desired amount of alignment precision, both of which may be specified by the user or the wheel alignment technician.

Thus, at the end of the calibration process, a set of calibration parameters are stored. In the simplest embodiment, the parameters include the difference between the encoder values for each wheel. Any change in that difference will indicate a change in the relative wheel alignment. Other embodiments include stored values for each sensor at several different points, statistical parameters such as variances and standard deviations which describe those values, and specific dead band values for the points. These stored values enable the system to compare the known state of alignment with the measured state of the wheels at a later time. Once the calibration parameters are stored, then a message is sent in a step 528 that calibration is complete and the process ends at a step 532.

Figure 6:
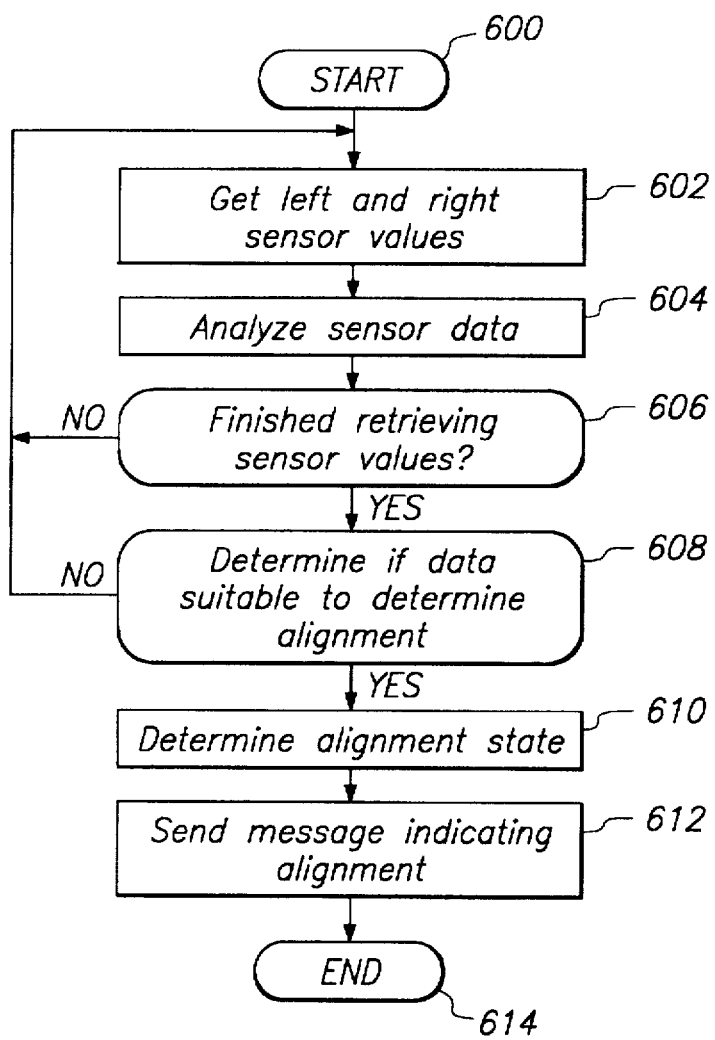
FIG. 6 is a process flow diagram which illustrates the process implemented on an alignment processing unit for alignment checking.

FIG. 6 is a process flow diagram which illustrates the process implemented on alignment processing unit 410 for alignment checking which corresponds to step 508 in FIG. 5. The process begins at 600. In a step 602, the left and right sensor values are retrieved. Next, in a step 604 the sensor data is analyzed. In a step 606, it is determined whether more sensor data points are to be retrieved. If more points are needed, then control is transferred back to step 602. If no more sensor data is to be retrieved, then control is transferred from step 606 to a step 608 where it is determined if the data is suitable to determine alignment. If the data is not suitable, control is transferred back to step 602 and more points are taken. The data is judged unsuitable in certain embodiments, for example, if multiple points are taken and the difference between the sensor values varies an amount greater than an allowable measurement variance threshold. This could occur if the user attempts to check alignment while driving on an unevenly paved road. In some embodiments, more data is taken if it is determined that data was not obtained for a broad enough range of points. A message may be sent so that the user knows that the sensor is taking a new set of data. If the data taken is deemed suitable for a satisfactory alignment check, then control is transferred to a step 610 where the alignment state is determined.

Once the alignment state is determined based on the data taken, a message is sent to the user indicating the state of alignment in a step 612. In certain embodiments, if a first alignment check fails, then a second check is performed before the user is sent a misalignment message. More than two or any number of checks can be required before a misalignment message is sent. In such cases, the user may be sent a message indicating that more data is being obtained to verify the check. Once a determination of alignment has been made and a final message sent to the user, the process ends at 614.

As noted above, the alignment state may be determined on one or multiple points. The multiple points may be taken at the same position or at different wheel positions, and a single dead band or a set of dead bands may be used. In the simplest case, a single measurement is made on the left and the right sensor and the difference between the sensors is computed and compared to the stored difference. If the difference is greater than the dead band difference limit, then the wheels are determined to be out of alignment. Other embodiments use a greater number of points and use statistical analysis to make a more accurate and reliable determination of alignment. In one such embodiment, a plurality of points are taken at different wheel positions and the average of the differences between the left and right wheel measured values are used to determine alignment. It is also possible to take a variance of the differences and toss out points which appear to be anomalous.

By using the above measurement techniques, and making repeated measurements which are statistically analyzed, it is possible to determine with a high degree of confidence that the wheels are misaligned and that a certain adjustment to one or both of the wheels would bring them closer to alignment. It is another feature of certain embodiments of the present invention that a system and method of adjusting the alignment of the wheels is provided which corrects the alignment. In some of these embodiments, a maximum alignment adjustment limit is set so that the amount of automatic alignment change which is allowed is limited for safety reasons.

In most linkage systems, a method of adjusting the alignment is provided that allows the length of the tie rod to be adjusted. Typically, wheel alignment adjustments are made by lengthening or shortening the tie rod manually. The tie rod is actually two threaded rods which are threaded so that they may be screwed together. By rotating one rod relative to the other, it is possible to lengthen or shorten the total length of the combined rods, which is the length of the tie rod as a whole, by decreasing or increasing the amount that the two rods engage each other. The present invention provides an apparatus and method for rotating the rods based on alignment measurements to automatically correct alignment.

Figure 7A:
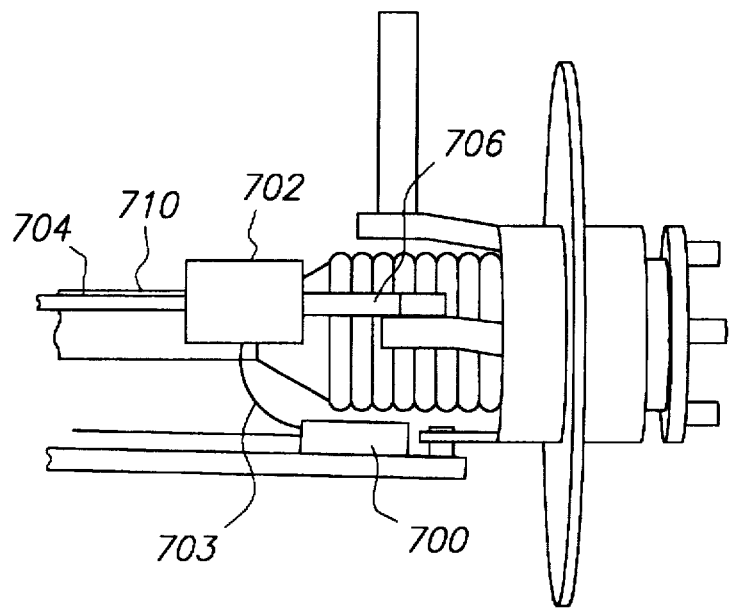
FIG. 7A illustrates an alignment adjuster which is used in connection with a wheel alignment monitor to adjust alignment based on the data obtained by the wheel alignment monitor.

FIG. 7A illustrates an alignment adjuster which is used in connection with a wheel alignment monitor 700 to adjust alignment based on the data obtained by wheel alignment monitor 700. Wheel alignment monitor 700 sends an adjustment signal to a tie rod adjusting unit 702. In the embodiment shown, a wire 703 is shown which carries the adjustment signal. In other embodiments, the signal is transmitted from wheel alignment monitor 700 to tie rod adjusting unit using a radio wave. It should be noted that in most automobile linkages, the length of the tie rod is adjustable for the purpose of making toe angle adjustments by rotating a threaded left portion or a threaded right portion of the tie rod either relative to each other or relative to a threaded sleeve. Therefore, in one embodiment, tie rod adjusting unit 702 is securely attached to a left tie rod portion 704 and to a right tie rod portion 706 of a tie rod. Upon the receipt of an adjustment command, tie rod adjusting unit 702 rotates the left tie rod portion 704 relative to the right tie rod portion 706 so that the length of the tie rod is either increased or decreased. In other embodiments, tie rod adjusting unit 702 operates similarly to rotate either the tie rods or a threaded sleeve to adjust the overall length of the tie rod.

Figure 7B:
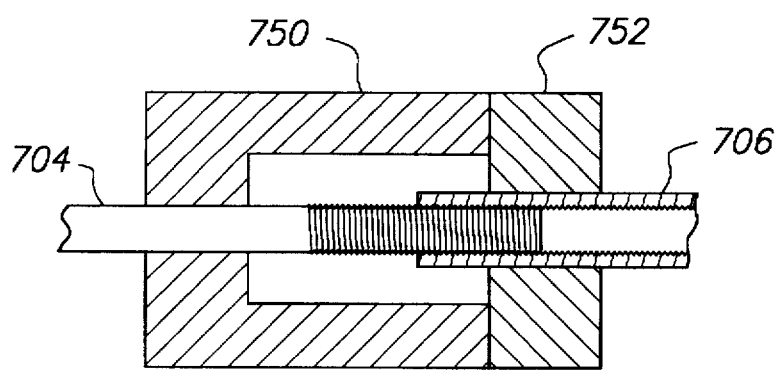
FIG. 7B illustrates schematically the structure of one embodiment of a tie rod adjusting unit.

FIG. 7B illustrates schematically the structure of one embodiment of tie rod adjusting unit 702. A base 750 of tie rod adjusting unit 702 is attached to left tie rod portion 704. A rotating member 752 is attached to right tie rod portion. Rotating member 752 is coupled to base 750 by a drive unit which rotates rotating member 752 relative to base 750. In one embodiment the drive unit is an electric motor. Thus, as rotating member 752 rotates, the total length of the tie rod is lengthened or shortened.

Figure 8:
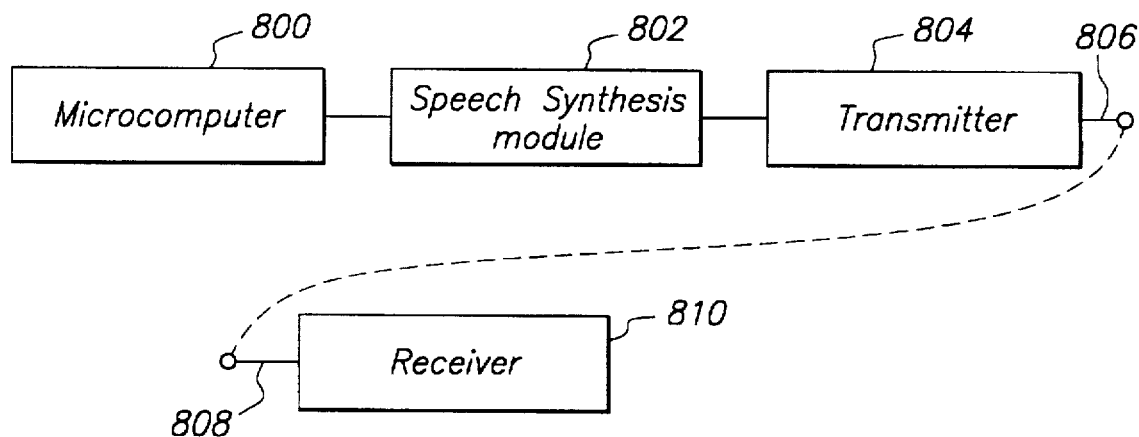
FIG. 8 is a block diagram which illustrates a system for informing a driver about alignment status after a measurement using the FM band of the driver's car radio.

FIG. 8 is a block diagram which illustrates a system for informing a driver about alignment status after a measurement using the FM band of the driver's car radio. This avoids the expense of providing a dedicated gauge or readout and also the need to provide a path through the vehicle firewall during installation of the device. Microcomputer 800, which processes alignment data to determine alignment, sends an address corresponding to a message indicating an alignment state to a speech synthesis module 802. Speech synthesis module 802 is connected to an FM transmitter 804. FM transmitter 804 transmits a signal via transmitting antenna 806 to receiving antenna 808 which is connected to the car radio. FM signals are used in a preferred embodiment because they effectively pass from the wheel area to the radio. In other embodiments, AM signals are used. In some embodiments, the alignment message is displayed on a dedicated gauge which is provided and in still other embodiments, the alignment message is transmitted to a central vehicle computer and displayed on a multipurpose display.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. An on board sensor for determining the relative position of linkage members in an automobile linkage which connects a wheel to an automobile body comprising:

a trackable object which is configured to be physically coupled to a first linkage member;

a tracking device suitable for association with a second linkage member and configured to be magnetically coupled to the trackable object so that the movements of the trackable object are substantially tracked by the tracking device as a result of the magnetic coupling between the trackable object and the tracking device; and a detector configured to determine the position of the tracking device;

whereby the determined position of the tracking device associated with the second linkage member determines the position of the first linkage member which is physically coupled to the trackable object.

2. The on board sensor as recited in claim 1 wherein the first linkage member is associated with a ball joint.

3. The on board sensor as recited in claim 1 wherein the second linkage member is a lower control arm.

4. The on board sensor as recited in claim 1 wherein the first linkage member is a ball joint collar.

5. The on board sensor as recited in claim 1 wherein the tracking device is physically mounted on the second linkage member.

6. The on board sensor as recited in claim 1 wherein the tracking device further includes:

a swing arm having an end which is configured to be magnetically coupled to the trackable object.

7. The on board sensor as recited in claim 6 wherein the detector further includes an encoder which encodes the position of the swing arm.

8. The on board sensor as recited in claim 7 wherein the encoder is an optical encoder.

9. The on board sensor as recited in claim 7 wherein the detector further includes a counter which counts the changes in position indicated by the encoder.

10. The on board sensor as recited in claim 7 wherein the detector further includes a reference point reset processor which resets the counter to a reference point when a predetermined number of counts representing changes in position in a certain direction are registered.

11. The on board sensor as recited in claim 7 wherein the encoder is an analog potentiometer.

12. The on board sensor as recited in claim 7 wherein the encoder is an analog optical encoder.

13. In automotive linkage for connecting wheels to a frame, a method of determining the state of alignment of wheels having toe angles comprising:

defining an alignment condition when a first wheel having a first toe angle and a second wheel having a second toe angle are substantially aligned with each other, including, determining a first aligned toe angle of the first wheel relative to a first reference point, determining a second aligned toe angle of the second wheel relative to a second reference point, using the aligned angular difference between the first aligned toe angle of the first wheel and the second aligned toe angle of the second wheel to define an alignment range of differences between the first toe angle of the first wheel and the second toe angle of the second wheel, the differences within the alignment range of differences substantially corresponding to the wheels being substantially aligned;

testing the alignment state of the wheels, including,
  determining a first test toe angle of the first wheel relative to a first toe angle reference point;
  determining a second test toe angle of the second wheel relative to a second toe angle reference point;
  using the tested angular difference between the first test toe angle and the second test toe angle to determine whether the tested angular difference is within the alignment range;

whereby, it is determined whether the two wheels are aligned.

14. The method as recited in claim 13 wherein the alignment range of differences between the first toe angle of the first wheel and the second toe angle of the second wheel is defined to include angular differences which differ from the aligned angular difference within a tolerance that allows for factors other than wheel misalignment.

15. The method as recited in claim 14 wherein the alignment range is 20 degrees wide.

16. The method as recited in claim 13 wherein a plurality of tested angular differences are determined for a plurality of toe angles associated with the first wheel and a plurality of toe angles associated with the second wheel and wherein the plurality of tested angular differences are used to determine whether the two wheels are aligned.

17. The method as recited in claim 16 wherein the proportion of the plurality of tested angular differences which are within the alignment range is used to determine whether the two wheels are aligned.

18. The method as recited in claim 17 wherein the wheels are determined to be aligned if the proportion of the plurality of tested angular differences which are within the alignment range is greater than 20 degrees.

19. The method as recited in claim 16 wherein the average of the plurality of the tested angular differences which are within the alignment range is used to determine whether the two wheels are aligned.

20. The method as recited in claim 19 further including:
  determining an adjustment to the first wheel based on the average of the plurality of the tested angular differences which improves the alignment of the first wheel relative to the second wheel; and
  adjusting the toe angle of the first wheel according to the adjustment, whereby the alignment of the two wheels is improved.

21. The method as recited in claim 13 wherein the first reference point is arbitrarily determined.

22. The method as recited in claim 13 wherein the first reference point is determined to correspond to an angular position relative to the frame.

23. A method as recited in claim 13 further including:
  resetting the first reference point by measuring changes in the toe angle of the first wheel and setting the measured toe angle to a predetermined value upon the occurrence of a predetermined change in the toe angle of the first wheel.

24. A method as recited in claim 13 further including:
  determining an adjustment to the first wheel based on the tested angular difference which improves the alignment of the first wheel relative to the second wheel; and
  adjusting the toe angle of the first wheel according to the adjustment, whereby the alignment of the two wheels is improved.

* * * * *